(12) United States Patent
Gelina

(10) Patent No.: US 11,025,021 B1
(45) Date of Patent: Jun. 1, 2021

(54) ELECTRICAL DEVICE COUPLING ADAPTER

(71) Applicant: Jamey Gelina, Wellington, FL (US)

(72) Inventor: Jamey Gelina, Wellington, FL (US)

( * ) Notice: Subject to any disclaimer, the term of this patent is extended or adjusted under 35 U.S.C. 154(b) by 42 days.

(21) Appl. No.: 16/591,712

(22) Filed: Oct. 3, 2019

(51) Int. Cl.
| | |
|---|---|
| *H01R 11/00* | (2006.01) |
| *H01R 31/06* | (2006.01) |
| *H01R 13/50* | (2006.01) |
| *H01R 13/52* | (2006.01) |
| *H01R 13/60* | (2006.01) |
| *H01R 24/28* | (2011.01) |
| *H01R 13/44* | (2006.01) |
| *H01R 13/639* | (2006.01) |

(52) U.S. Cl.
CPC ............ *H01R 31/06* (2013.01); *H01R 13/44* (2013.01); *H01R 13/50* (2013.01); *H01R 13/5202* (2013.01); *H01R 13/60* (2013.01); *H01R 13/6395* (2013.01); *H01R 24/28* (2013.01)

(58) Field of Classification Search
CPC ... H01R 31/06; H01R 25/006; F21V 33/0052; F21V 21/26; F21S 48/1742
USPC ........... 439/502, 535, 638; 362/85, 287, 427
See application file for complete search history.

(56) References Cited

U.S. PATENT DOCUMENTS

| | | | | | |
|---|---|---|---|---|---|
| 3,584,822 | A | * | 6/1971 | Oram ...................... | F21V 21/29 248/160 |
| 3,951,490 | A | * | 4/1976 | Devendorf ........... | H01R 9/0506 439/63 |
| 3,989,333 | A | * | 11/1976 | Cauldwell ............ | H01R 9/0506 439/76.1 |
| 4,211,464 | A | * | 7/1980 | Lee ....................... | H01R 25/006 439/535 |
| 4,219,868 | A | * | 8/1980 | Bowman ................... | F21S 8/06 362/147 |
| 4,226,495 | A | * | 10/1980 | Palle .................... | H01R 9/0506 439/535 |
| 4,995,309 | A | * | 2/1991 | Weaver ................. | E02D 31/008 285/64 |
| 5,855,494 | A | * | 1/1999 | Blaszczyk .............. | H01R 31/02 361/735 |
| 5,881,983 | A | * | 3/1999 | Hofmann ............... | A45D 20/12 248/176.1 |
| 6,527,005 | B2 | * | 3/2003 | Weaver ................. | E02D 31/008 137/312 |

(Continued)

*Primary Examiner* — Thanh Tam T Le
(74) *Attorney, Agent, or Firm* — Gulf Coast Intellectual Property Group

(57) ABSTRACT

An electrical device coupling adapter that is operable to electrically connect an electrically operated device exteriorly located to a structure with a low voltage power source or a alternating current power source located within the interior of the structure. The present invention includes a housing being comprised of a base plate and a case portion wherein the case portion is removably secured to one side of the base plate. A first conduit member is secured to the case portion of the housing and is manufactured from a flexible tubing material. A second conduit member is sealably coupled to the base plate opposite the case portion. The second conduit member is rigid and tubular in form and extends outward from the base plate. A supply wire is secured within the second conduit member and can be configured to electrically coupled to either a AC or DC power source.

6 Claims, 1 Drawing Sheet

(56) References Cited

U.S. PATENT DOCUMENTS

| | | | | |
|---|---|---|---|---|
| 6,878,889 B1* | 4/2005 | Horst | ............... | E05F 15/668 |
| | | | | 200/283 |
| 7,163,418 B2* | 1/2007 | Macor | ............... | H01R 24/547 |
| | | | | 439/49 |
| 7,494,244 B1* | 2/2009 | Van Diep | ............... | F21S 2/00 |
| | | | | 362/234 |
| 8,147,271 B2* | 4/2012 | Xie | ............... | H01R 31/06 |
| | | | | 439/502 |
| 8,496,515 B2* | 7/2013 | Bailey | ............... | F04D 29/701 |
| | | | | 454/341 |
| 8,901,420 B2* | 12/2014 | Hellwig | ............... | H05K 5/0252 |
| | | | | 174/59 |
| 10,079,462 B1* | 9/2018 | Gelina | ............... | H01R 31/06 |
| 10,689,825 B1* | 6/2020 | Gelina | ............... | F24F 7/065 |

* cited by examiner

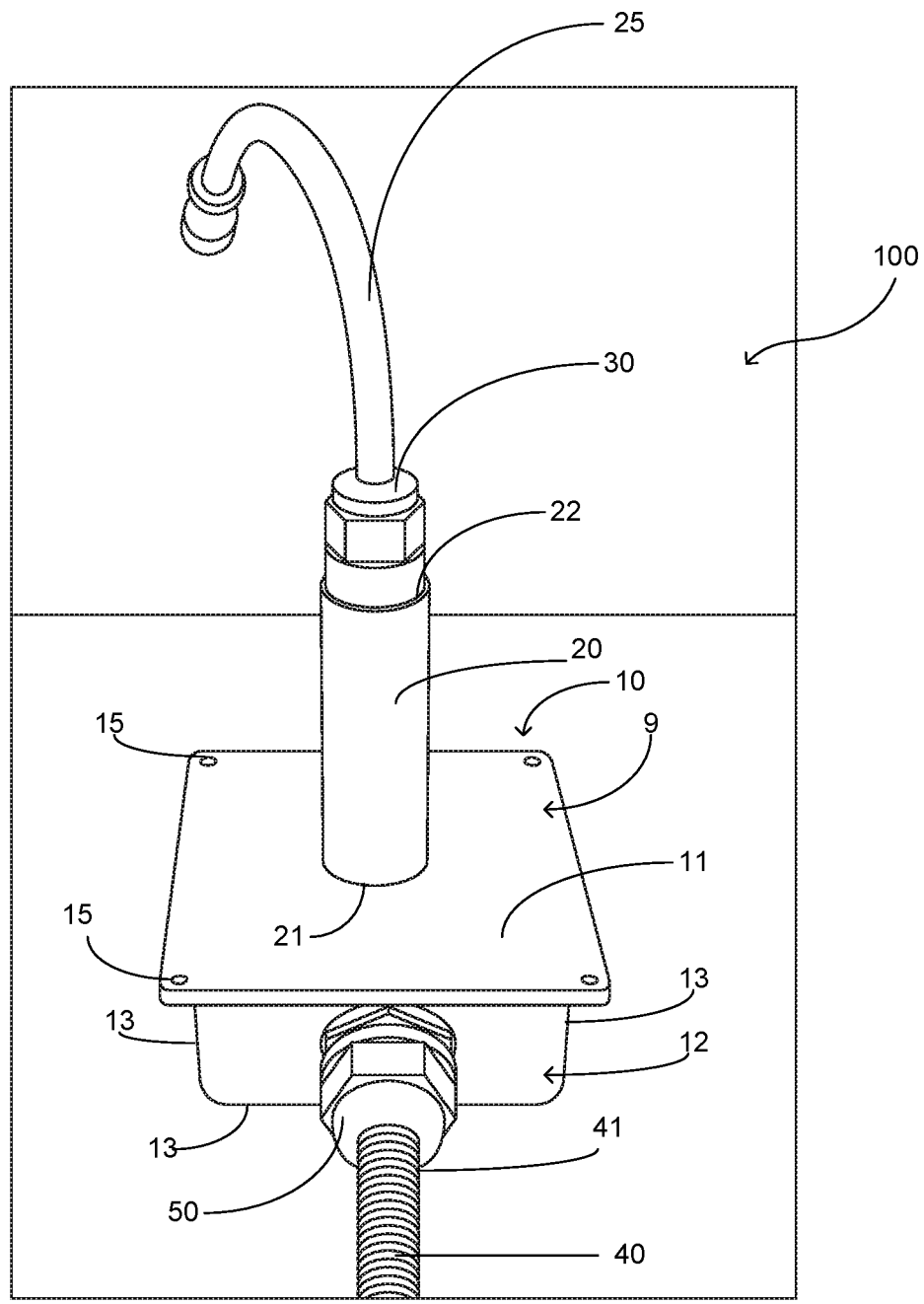

ELECTRICAL DEVICE COUPLING ADAPTER

FIELD OF THE INVENTION

The present invention relates generally to electrical devices, more specifically but not by way of limitation, an electrical coupling device that is operable to electrically couple a device located exterior of a structure and an internal power source wherein the present invention facilitates an improved technique of electrical connection.

BACKGROUND

Commercial and residential structures are configured with electrical systems operable to provide operation of integral devices such as appliances and light fixtures. These electrical systems further provide receptacles at various locations within the structure so as to provide power for portable devices and the like. As is known in the art, electrical systems for structures typically cost tens of thousands of dollars and as such placement of electrical receptacles for some facilities can be sparse so as to reduce cost.

One issue with conventional electrical layouts is the reduced availability of electrical outlets on the exterior of structures such as but not limited to residential homes. Typically residential structures will have less than two to three electrical outlets located on the exterior of the home. While this will accommodate most needs, it can present deficiencies in electrical capacity during installation of more permanent system such as but not limited to radon fans. The alternative to utilizing an existing outlet can be to install a new breaker, wiring and outlet to increase the capacity so as to accommodate the new electrical device. The aforementioned can be quite costly and often results as a constraint in moving forward with the installation of the electrical device.

Accordingly, there is a need for an electrical device coupling adapter that is configured to be mounted on the exterior of a structure such as but not limited to a home wherein the present invention facilitates the electrical coupling of a device and an internal power source.

SUMMARY OF THE INVENTION

It is the object of the present invention to provide an electrical device coupling adapter configured to facilitate an electrical connection between a device located on the exterior of a structure with a power source disposed within the interior of the structure.

Another object of the present invention is to provide an electrical adapter configured to couple a device with a power source located internally in a structure wherein the electrical adapter includes a weatherproof housing.

A further object of the present invention is to provide an electrical device coupling adapter configured to facilitate an electrical connection between a device located on the exterior of a structure with a power source disposed within the interior of the structure wherein the housing includes a first conduit sealably coupled thereto.

Still another object of the present invention is to provide an electrical adapter configured to couple a device with a power source located internally in a structure wherein the housing includes a second conduit sealably coupled to the housing that is perpendicularly oriented with the housing extending outward therefrom.

An additional object of the present invention is to provide an electrical device coupling adapter configured to facilitate an electrical connection between a device located on the exterior of a structure with a power source disposed within the interior of the structure wherein disposed in the first conduit is an electrical cord that is directly connected to an outdoor electrical device.

Yet a further object of the present invention is to provide an electrical adapter configured to couple a device with a power source located internally in a structure wherein the second conduit includes a lower rigid portion and further has a second electrical cord disposed therein.

Another object of the present invention is to provide an electrical device coupling adapter configured to facilitate an electrical connection between a device located on the exterior of a structure with a power source disposed within the interior of the structure wherein the second electrical cord is configured to couple to a one hundred and twenty volt power source or a low voltage power source.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is a perspective view of the present invention.

DETAILED DESCRIPTION

Referring now to the drawings submitted herewith, wherein various elements depicted therein are not necessarily drawn to scale and wherein through the views and figures like elements are referenced with identical reference numerals, there is illustrated an electrical device coupling adapter 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1, the electrical device coupling adapter 100 further includes a housing 10. The housing 10 is manufactured from a suitable durable material such as but not limited to plastic. The housing 10 includes a base plate 11 and case portion 12 wherein the case portion 12 is configured with a plurality of walls 13 forming an interior volume(not particularly illustrated herein) of the housing 10 ensuing assembly of the base plate 11 and case portion 12. It is contemplated within the scope of the present invention that the housing 10 could be manufactured in alternate sizes and shape depending upon the desired application and mounting location of the electrical device coupling adapter 100. The base plate 11 has formed therein apertures 15 wherein the apertures are located in each corner of the base plate 11. The apertures 15 are present to facilitate the journaling of fasteners therethrough in order to secure the housing 10 to a wall or other suitable support surface. While four apertures 15 are illustrated herein, it is contemplated within the scope of the present invention that the base plate 11 could have alternate quantities of apertures 15 formed therein.

Secured to the base plate 11 and extending outward therefrom is the second conduit member 20. The second conduit member 20 is perpendicular to the lower surface 9 of the base plate 11 extending outward therefrom and being tubular in shape. The second conduit member 20 is sealably coupled at the first end 21 thereof to the base plate 11 utilizing suitable durable techniques. The second conduit member 20 is manufactured of a sufficient length so as to be journaled through a hole formed in a wall to which the electrical device coupling adapter 100 is being secured. The tubular shape of the second conduit member 20 allows an installer of the electrical device coupling adapter 100 to utilize a conventional drill and drill bit to form a hole in a wall in a desired location. The shape of the second conduit member 20 has a diameter that is slightly less than that of a hole formed in the wall so as to allow insertion thereinto and further provide easy sealing thereof with weatherproofing materials such as but not limited to caulk. It should be understood within the scope of the present invention that the second conduit member 20 could be manufactured in alternate lengths so as to accommodate various thicknesses in walls.

The second conduit member 20 includes supply wire 25 operably inserted thereinto at second end 22. The supply wire 25 is sealably secured to the second end 22 of the second conduit member 20 utilizing fastener 30. The supply wire 25 is provided in a first embodiment and a second embodiment within the scope of the present invention. In a first embodiment the supply wire 25 is configured with a receptacle connection that is operably coupled with a conventional one hundred and twenty volt electrical receptacle the is present within the interior volume of the structure. A second embodiment of the supply wire 25 is provided within the scope of the present invention and includes a receptacle configured to operably couple to a low voltage power source such as but not limited to a direct current power source.

The electrical device coupling adapter 100 further includes a first conduit member 40 that is sealably secured to the sidewall 13 of the case portion 12 of the housing 10. The first conduit member 40 is secured to the case portion 12 utilizing fastener 50 wherein fastener 50 is secured to the first end 41 of the first conduit member 40 ensuring a weatherproof seal. Those skilled in the art will recognize that various alternate fasteners could be employed for the fastener 50. The first conduit member 40 is provided in the required length so as to be operably coupled to the electrical device(not pictured herein) with which the electrical device coupling adapter 100 is coupling to a power source located within the interior of a structure. The first conduit member 40 is manufactured from a flexible material, which is desirable so as to provide routing options during installation as opposed to limitations that could be created by rigid tubing. Disposed within the first conduit member 40 is an electrical wire(not illustrated herein) wherein the electrical wire is directly coupled to an electrical device. The electrical wire is electrically coupled to the supply wire 25 within the interior volume of the housing 10. While not particularly illustrated herein, it is further contemplated within the scope of the present invention that a switch could be mounted to the housing 10 wherein the switch would be a conventional switch and provide interruption of electrical flow from the supply wire 25 to a device electrically coupled to the wire disposed within the first conduit member 40.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An electrical device coupling adapter that is operable to electrically connect a device exteriorly located to a structure with a power source located interiorly in the structure wherein the adapter comprises:

a housing, said housing having a base plate and a case portion, said case portion being removably coupled to said base plate, said case portion forming an interior volume of said housing;

a first conduit member, said first conduit member being secured to a side of said case portion, said first conduit member having a first end and a second end, said first conduit member being manufactured from a flexible material;

a second conduit member, said second conduit member being secured to said base plate opposite said case portion, said second conduit member being perpendicular to said base plate and extending outward therefrom, said second conduit member having a first end and a second end, said second conduit member being tubular in form and wherein said first end of said second conduit member is sealably coupled to said base plate, wherein said second conduit member further includes a fastener, said fastener being secured to said second end of said second conduit member, said fastener configured to sealably secure said supply wire; and a supply wire, said supply wire being disposed within said second conduit member, said supply wire being configured to electrically couple to a power source disposed inside a structure to which the electrical device coupling adapter is mounted to the exterior of the structure, wherein said supply wire is configured to electrically couple to a one hundred and twenty volt power source and wherein said supply wire is configured to electrically couple to a low voltage direct current power source.

2. The electrical device coupling adapter as recited in claim 1, wherein said first conduit member includes a wire disposed therein wherein the wire is coupled to said supply wire within said housing and an electrical device proximate said second end of said first conduit member.

3. The electrical device coupling adapter as recited in claim 2, wherein said base plate further includes at least one aperture, said at least one aperture of said base plate configured to have a fastener journaled therethrough so as to secure said housing to an exterior wall of the structure.

4. An electrical device coupling adapter that is operable to electrically connect an electrically operated device exteriorly located to a structure with a low voltage power source or a alternating current power source located within the interior of the structure wherein the electrical device coupling adapter comprises:

a housing, said housing having a base plate and a case portion, said base plate having a first side and a second side, said case portion being removably secured to said first side of said base plate, said case portion having a plurality of walls, said plurality of walls operable to form an interior volume of said housing, said case portion being removably coupled to said base plate, said housing being manufactured from a weatherproof material;

a first conduit member, said first conduit member being secured to one of said plurality of walls of said case portion, said first conduit member having a first end and a second end, said first end of said first conduit member being secured to said case portion, said second end of said first conduit member being secured to the electrically operated device, said first conduit member being manufactured from a flexible material;

a second conduit member, said second conduit member being secured to said second side of said base plate opposite said case portion, said second conduit member being perpendicular to said base plate and extending outward therefrom, said second conduit member being tubular in shape, said second conduit member having a first end and a second end, said second conduit member being sealably secured to said base plate proximate said first end of said second conduit member; and a supply wire, said supply wire being disposed within said second conduit member, said supply wire being sealably secured to said second end of said second conduit member utilizing a fastener, said supply wire being configured to electrically couple to a power source disposed inside a structure to which the electrical device coupling adapter is mounted to the exterior of the structure.

5. The electrical device coupling adapter as recited in claim 4, wherein said base plate further includes a plurality of apertures, said plurality of apertures of said base plate configured to have a fastener journaled therethrough so as to secure said housing to an exterior wall of the structure.

6. The electrical device coupling adapter as recited in claim 5, wherein said second conduit member has a wire disposed therein wherein the wire is electrically coupled to the supply wire within said housing and to the electrically operated device.

* * * * *